(12) United States Patent
Matsumoto

(10) Patent No.: US 11,063,423 B2
(45) Date of Patent: *Jul. 13, 2021

(54) DRIVING CIRCUIT FOR POWER TRANSISTOR

(71) Applicant: ROHM CO., LTD., Kyoto (JP)

(72) Inventor: Naoki Matsumoto, Kyoto (JP)

(73) Assignee: ROHM CO., LTD., Kyoto (JP)

( * ) Notice: Subject to any disclaimer, the term of this patent is extended or adjusted under 35 U.S.C. 154(b) by 181 days.

This patent is subject to a terminal disclaimer.

(21) Appl. No.: 16/366,305

(22) Filed: Mar. 27, 2019

(65) Prior Publication Data

US 2019/0305545 A1  Oct. 3, 2019

(30) Foreign Application Priority Data

Mar. 29, 2018  (JP) .............................. JP2018-065333

(51) Int. Cl.
*H02H 7/00* (2006.01)
*H02H 7/122* (2006.01)
*H02H 1/00* (2006.01)

(52) U.S. Cl.
CPC ........ *H02H 7/1227* (2013.01); *H02H 1/0007* (2013.01)

(58) Field of Classification Search
None
See application file for complete search history.

(56) References Cited

U.S. PATENT DOCUMENTS 9,948,196 B2 *  4/2018  Kikuchi ............ H02M 3/33592
10,075,081 B2 *  9/2018  Kikuchi ............ H02M 3/33592

FOREIGN PATENT DOCUMENTS

JP    2012010544 A    1/2012
JP    2017093065 A    5/2017

* cited by examiner

*Primary Examiner* — Stephen W Jackson
(74) *Attorney, Agent, or Firm* — Cantor Colburn LLP (57) ABSTRACT

A low-side driving circuit forms a power conversion apparatus together with a power transistor to be driven. A protection circuit generates a protection signal S1. An alarm control circuit changes an electrical state of a fail terminal according to the protection signal S1. A judgment circuit compares a voltage $V_{FO}$ at a fail (FO) terminal with a predetermined threshold value, and generates a judgment signal S2 that indicates the comparison result. A control logic circuit controls the state of the power transistor based on the judgment signal S2 and the protection signal S1.

7 Claims, 9 Drawing Sheets

DRIVING CIRCUIT FOR POWER TRANSISTOR

CROSS REFERENCE TO RELATED APPLICATION

The present application claims priority under 35 U.S.C. § 119 to Japanese Application No. 2018-065333, filed Mar. 29, 2018, the entire content of which is incorporated herein by reference.

BACKGROUND OF THE INVENTION

1. Field of the Invention

The present invention relates to a driving circuit for a power transistor.

2. Description of the Related Art

Figure 1:
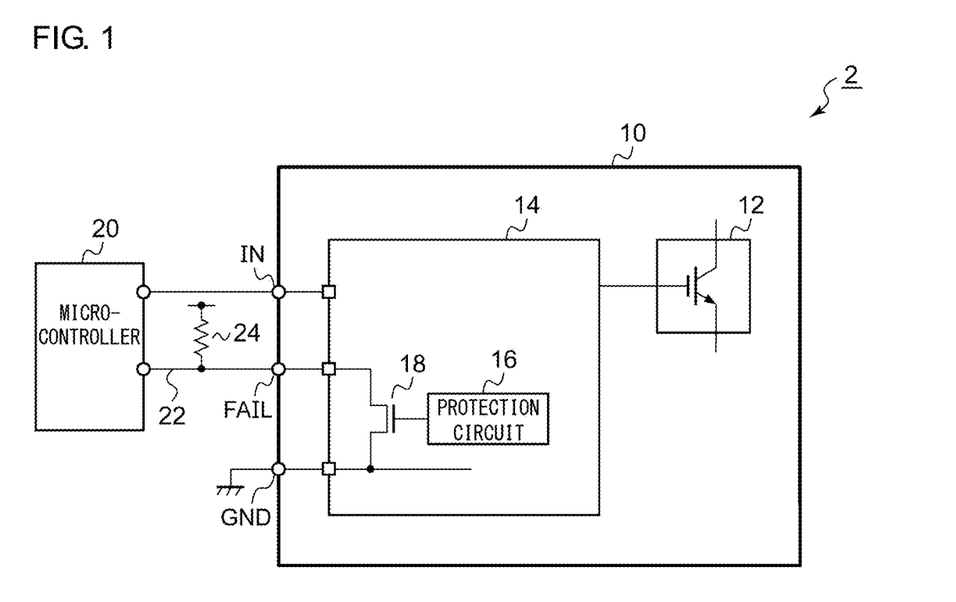
FIG. 1 is a block diagram showing a power conversion apparatus.

A power conversion apparatus such as an inverter, converter, or the like is employed in hybrid vehicles, electric vehicles, and industrial equipment. FIG. 1 is a block diagram showing a power conversion apparatus 2. The power conversion apparatus 2 mainly includes a power transistor 12 and a driving circuit (gate driver) 14 that drives the power transistor 12. The power transistor 12 and the driving circuit 14 are housed in a single package (power module 10) together with a protection circuit 16.

A control signal is input from a microcontroller 20 to a control input (IN) pin of the power module 10. The on/off state of the power transistor 12 is controlled according to the control signal.

The power module 10 is provided with a fail (FO) pin. The FO pin is coupled to the microcontroller 20 via wiring 22. The microcontroller 20 is capable of detecting an abnormal state that can occur in the power module 10 based on the electrical state of the FO pin. Typically, in many cases, an open-drain (open-collector) interface is employed for such an FO pin. A transistor 18 is provided between the FO pin and a ground (GND) pin. The wiring 22 is pulled up via an external resistor 24. Upon detecting an abnormal state, the protection circuit 16 turns on the transistor 18 so as to generate a low-level voltage (ground voltage) at the FO pin.

As a result of investigating the power conversion apparatus 2 shown in FIG. 1, the present inventors have come to recognize the following problem. The electrical state of the FO pin is affected by the wiring 22 that couples the FO pin and the microcontroller 20 or a peripheral circuit. Accordingly, if the electrical state of the FO pin input to the microcontroller 20 does not match the state of the output of the internal protection circuit of the driving circuit 14, this leads to a mismatch between the microcontroller 20 and the power module 10.

As an example, let us consider a case in which, when the protection circuit 16 has judged that the power module 10 is operating normally, a short-circuit occurs in the wiring 22 or noise contamination occurs in the wiring 22. In this case, the microcontroller 20 judges that an abnormal state has occurred, and executes a protection operation. In contrast, the power module 10 has judged that it is operating normally, and maintains its operation.

SUMMARY OF THE INVENTION

The present invention has been made in view of such a situation. Accordingly, it is an exemplary purpose of an embodiment of the present invention to provide a driving circuit or a power module that is capable of detecting a mismatch between an internal protection state and the state of the FO pin.

An embodiment of the present invention relates to a driving circuit structured to drive a transistor to be driven. The driving circuit comprises: a protection circuit structured to generate a protection signal; a fail terminal; an alarm control circuit structured to change an electrical state of the fail terminal according to the protection signal; a control judgment circuit structured to compare a voltage at the fail terminal with a predetermined threshold value, and to generate a judgment signal that indicates a comparison result; and a logic circuit structured to control the state of the transistor based on the judgment signal and the protection signal.

Another embodiment of the present invention relates to a power module. The power module comprises: a power transistor; and a driving circuit structured to drive the power transistor; and a fail terminal. The driving circuit comprises: a protection circuit structured to generate a protection signal; an alarm control circuit structured to change an electrical state of the fail terminal according to the protection signal; a judgment circuit structured to compare a voltage at the fail terminal with a predetermined threshold value, and to generate a judgment signal that indicates a comparison result; and a control logic circuit structured to control the state of the transistor based on the protection signal and the judgment signal.

It is to be noted that any arbitrary combination or rearrangement of the above-described structural components and so forth is effective as and encompassed by the present embodiments. Moreover, this summary of the invention does not necessarily describe all necessary features so that the invention may also be a sub-combination of these described features.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE INVENTION

The invention will now be described based on preferred embodiments which do not intend to limit the scope of the present invention but exemplify the invention. All of the features and the combinations thereof described in the embodiment are not necessarily essential to the invention.

SUMMARY OF EMBODIMENTS

An embodiment of the present invention disclosed in the present specification relates to a driving circuit that forms a power conversion apparatus together with a power transistor to be drive. The driving circuit comprises: a protection circuit structured to generate a protection signal; a fail terminal; an alarm control circuit structured to change an electrical state of the fail terminal according to the protection signal; a judgment circuit structured to compare a voltage at the fail terminal with a predetermined threshold value, and to generate a judgment signal that indicates a comparison result; and a control logic circuit structured to control the state of the power transistor based on the judgment signal and the protection signal.

With this embodiment, both the internal state of the driving circuit indicated by the protection signal and the state recognized by the microcontroller indicated by the judgment signal can be reflected in the control operation of the power transistor.

Also, when at least one from among the judgment signal and the protection signal indicates an abnormal state, the control logic circuit may suspend a driving operation of the power transistor.

Also, in the operation of the driving circuit, a capacitor may be provided as an external component to the fail terminal. Due to the effect of the capacitor, there is a delay in transition of the electrical state (voltage) of the fail terminal after the protection signal changes. Accordingly, the period of time in which the microcontroller judges that that there is an abnormal state is longer than the period of time in which the driving circuit judges that there is an abnormal state. Even in this case, by referring to both the protection signal and the judgment signal, this arrangement is capable of ensuring matching between the operation of the microcontroller and the state of the driving circuit.

Another embodiment of the present invention disclosed in the present specification relates to a power module. The power module comprises: a power transistor; and a driving circuit structured to drive the power transistor; and a fail terminal. The driving circuit comprises: a protection circuit structured to generate a protection signal; an alarm control circuit structured to change an electrical state of the fail terminal according to the protection signal; a judgment circuit structured to compare a voltage at the fail terminal with a predetermined threshold value, and to generate a judgment signal that indicates a comparison result; and a control logic circuit structured to control the state of the transistor based on the protection signal and the judgment signal.

Description will be made below regarding preferred embodiments according to the present invention with reference to the drawings. The same or similar components, members, and processes are denoted by the same reference numerals, and redundant description thereof will be omitted as appropriate. The embodiments have been described for exemplary purposes only, and are by no means intended to restrict the present invention. Also, it is not necessarily essential for the present invention that all the features or a combination thereof be provided as described in the embodiments.

In the present specification, the state represented by the phrase "the member A is coupled to the member B" includes a state in which the member A is indirectly coupled to the member B via another member that does not substantially affect the electric connection between them, or that does not damage the functions or effects of the connection between them, in addition to a state in which they are physically and directly coupled.

Similarly, the state represented by the phrase "the member C is provided between the member A and the member B" includes a state in which the member A is indirectly coupled to the member C, or the member B is indirectly coupled to the member C via another member that does not substantially affect the electric connection between them, or that does not damage the functions or effects of the connection between them, in addition to a state in which they are directly coupled.

Also, the phrase "a signal A (voltage or current) corresponds to a signal B (voltage or current)" means the state in which the signal A has a correlation with the signal B. Specific examples of such a state include: (i) a state in which the signal A is the same as the signal B; (ii) a state in which the signal A is proportional to the signal B; (iii) a state in which the signal A is obtained by shifting the level of the signal B; (iv) a state in which the signal A is obtained by amplifying the signal B; (v) a state in which the signal A is obtained by inverting the signal B; (vi) a desired combination of the aforementioned states (i) through (v); and the like. The range of "corresponds" as described above is determined by the kinds of the signals A and B and the usage of the signals A and B, which can clearly be understood by those skilled in this art.

In the present specification, the reference symbols denoting electrical signals such as a voltage signal, current signal, or the like, and the reference symbols denoting circuit elements such as a resistor, capacitor, or the like, also represent the corresponding voltage value, current value, resistance value, or capacitance value as necessary. Also, the reference symbols denoting terminals each represent a voltage or a signal level that occurs at the terminal.

Figure 2:
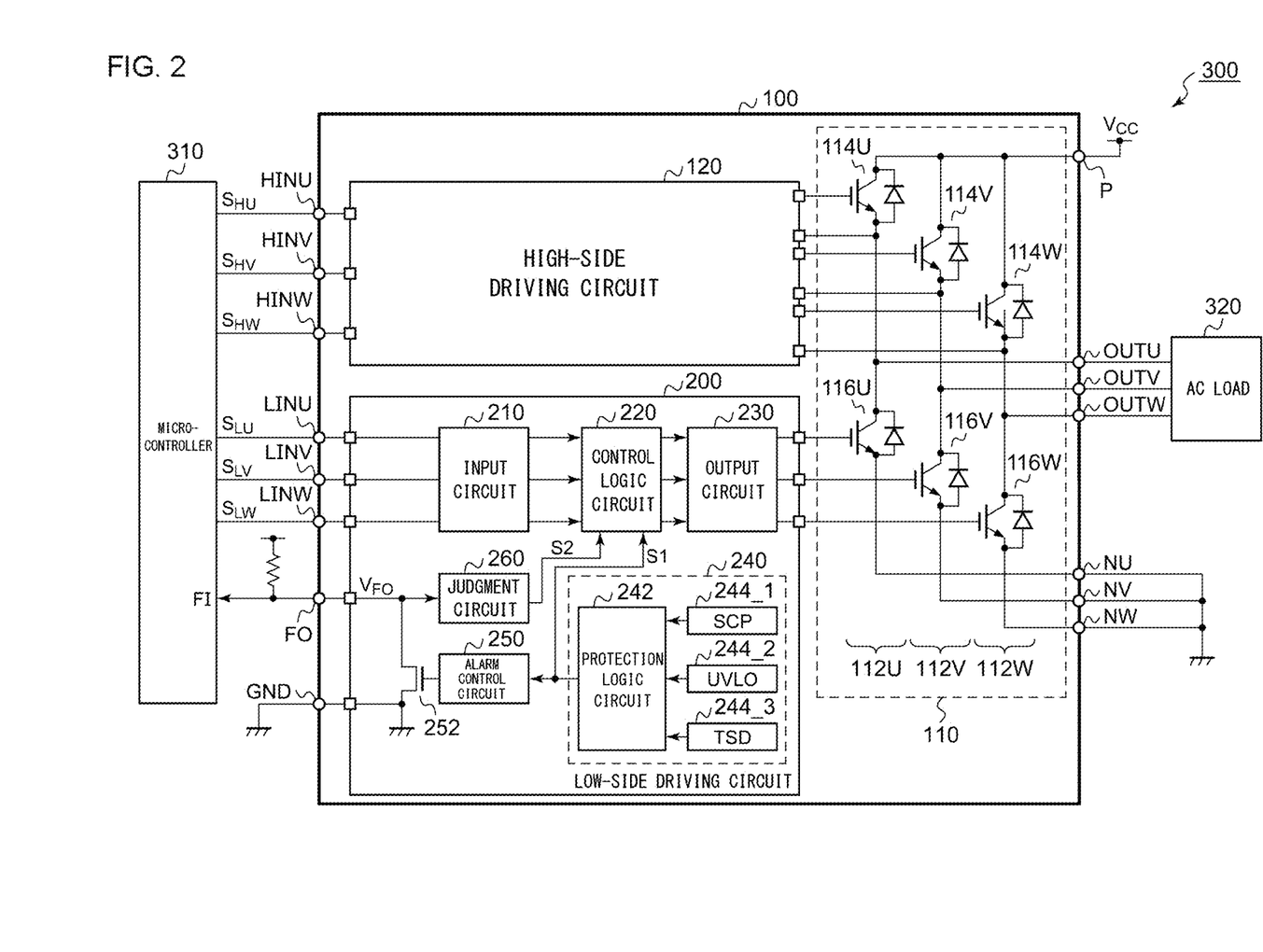
FIG. 2 is a block diagram showing a power conversion apparatus including a power module according to an embodiment.

FIG. 2 is a block diagram showing a power conversion apparatus 300 including a power module 100 according to an embodiment. In the present embodiment, the power conversion apparatus 300 includes a power module 100, a microcontroller 310, and an AC load 320. The power module 100 receives a DC voltage $V_{CC}$, and supplies an AC driving voltage to the AC load 320 according to a control signal received from the microcontroller 310.

The power module 100 includes a three-phase inverter 110, a high-side driving circuit 120, and a low-side driving circuit 200. In the present embodiment, the high-side driving circuit 120 and the low-side driving circuit 200 are integrated on separate semiconductor chips (dies).

The three-phase inverter 110 includes legs 112U, 112V, and 112W that support the U phase, V phase, and W phase, respectively. Each leg 112# ("#" represents "U", "V", or "W") includes a positive-electrode power supply pin (or terminal) P, an upper arm 114 # arranged between the positive-electrode power supply pin P and the corresponding output pin OUT#, and a lower arm 116 # arranged between the corresponding output pin OUT # and a negative-electrode power supply pin N #. The upper arms 114U through 114W and the lower arms 116U through 116W are each configured as a power transistor. The output pins OUTU through OUTW are coupled to an AC load 320 such as a three-phase motor or the like. FIG. 2 shows an example in which the negative-electrode power supply pins NU through UW are directly grounded. Also, the negative-electrode power supply pins NU through UW may be grounded via a current-detection shunt resistor.

As such a power transistor, a SiC (silicon carbide) transistor, a GaN (gallium nitride) transistor, or a Si (silicon) transistor may be employed. Also, examples of the kinds of power transistors that can be employed include a MOSFET (Metal Oxide Semiconductor Field Effect Transistor) and a bipolar transistor, in addition to an IGBT (Insulated Gate Bipolar Transistor) as shown in FIG. 1.

The HINU pin, HINV pin, and HINW pin receive control signals $SH_U$, $SH_V$, and $SH_W$ as input signals that indicate the on/off states of the upper arms 114U, 114V, and 114W, respectively. The high-side driving circuit 120 controls each upper arm 114 # according to the corresponding control signal $SH_\#$.

As shown in FIG. 1, in a case in which each upper arm is configured as an N-channel (or NPN) transistor, the high-side driving circuit 120 generates a high-level voltage VH that is higher than the power supply voltage $V_{CC}$ by means of a so-called bootstrap circuit, so as to turn on the upper arm. The high-side driving circuit 120 may be configured using known techniques. Accordingly, in the present specification, description thereof will be omitted.

The LINU pin, LINV pin, and LINW pin receive control signals $SL_U$, $SL_V$, and $SL_W$ as input signals that indicate the on/off states of the lower arms 116U, 116V, and 116W, respectively. The low-side driving circuit 200 controls each lower arm 116 # according to the corresponding control signal $SL_\#$.

The low-side driving circuit 200 includes an input circuit 210, a control logic circuit 220, an output circuit 230, a protection circuit 240, an alarm control circuit 250, an output transistor 252, and a judgment circuit 260.

The input circuit 210 receives the control signals $SL_U$ through $SL_W$ from the microcontroller 310. The control signals $SL_U$ through $SL_W$ are supplied to the output circuit 230 via the control logic circuit 220. The output circuit 230 includes a driver, and drives the power transistor configured as the lower arm 116 # according to the corresponding control signal $SL_\#$.

The protection circuit 240 generates a protection signal S1. For example, the protection circuit 240 includes multiple (three in this embodiment) abnormal state detection circuits 244_1 through 244_3 and a protection logic circuit 242. The abnormal state detection circuit 244_1 is configured as an SCP (Short Circuit Protection) circuit, for example. The abnormal state detection circuit 244_2 is configured as a UVLO (Under Voltage Lock Out) circuit. The abnormal state detection circuit 244_3 is configured as a TSD (Thermal Shutdown) circuit. In addition, the protection circuit 240 may include an OCP (Over Current Protection) circuit or the like. When each abnormal state detection circuit 244_# ("#"=1 through 3) detects an abnormal state to be detected, the abnormal state detection circuit 244_# asserts the corresponding abnormal state detection signal S3_# (set to the high level, for example).

When at least one from among the abnormal state detection signals S3_1 through S3_3 is asserted, the protection logic circuit 242 asserts the protection signal S1. The assertion of the protection signal S1 is used as a trigger for executing the protection operation. The protection signal S1 is supplied to the control logic circuit 220, and is input to the alarm control circuit 250.

The output transistor 252 is arranged between the fail (FO) pin and the ground. The output transistor 252 forms an open-drain output interface. The FO pin is pulled up via an external resistor 312. The FO pin is coupled to a fail detection (FI) pin of the microcontroller 310 via wiring 314. The microcontroller 310 detects an abnormal state that has occurred in the power module 100 based on the electrical state of the FI pin (i.e., FO pin).

The alarm control circuit 250 changes the electrical state of the FO pin according to the protection signal S1. More specifically, the alarm control circuit 250 turns on the output transistor 252 in response to the assertion of the protection signal S1. In this state, the voltage $V_{FO}$ at the FO pin is set to the low level (ground voltage). When the protection signal S1 is negated (set to the low level), i.e., when the protection signal S1 indicates the normal state, the alarm control circuit 250 turns off the output transistor 252. In this state, the voltage $V_{FO}$ at the FO pin is set to the high level (power supply voltage).

The judgement circuit 260 compares the voltage $V_{FO}$ at the FO terminal with a predetermined threshold voltage $V_{TH}$, and generates a judgment signal S2 that indicates the comparison result. For example, when the voltage $V_{FO}$ at the FO terminal is set to the low level ($V_{FO}<V_{TH}$), the judgment signal S2 is asserted (set to the high level). Conversely, when the voltage $V_{FO}$ at the FO terminal is set to the high level ($V_{FO}>V_{TH}$), the judgment signal S2 is negated (set to the low level). The judgment signal S2 is supplied to the control logic circuit 220 together with the protection signal S1.

The control logic circuit 220 controls the state of each power transistor based on both the judgment signal S2 and the protection signal S1.

For example, when at least one from among the judgment signal S2 and the protection signal S1 indicates an abnormal state (assertion), the control logic circuit 220 supplies the gate signal $V_G$ set to the low level to the gates of the power transistors forming the lower arms 116, irrespective of the levels of the control signals $SL_U$, $SL_V$ and $SL_W$, so as to turn off the corresponding power transistors, which suspends the driving operation.

The above is the configuration of the power module 100. Next, description will be made regarding the operation thereof.

Figure 3:
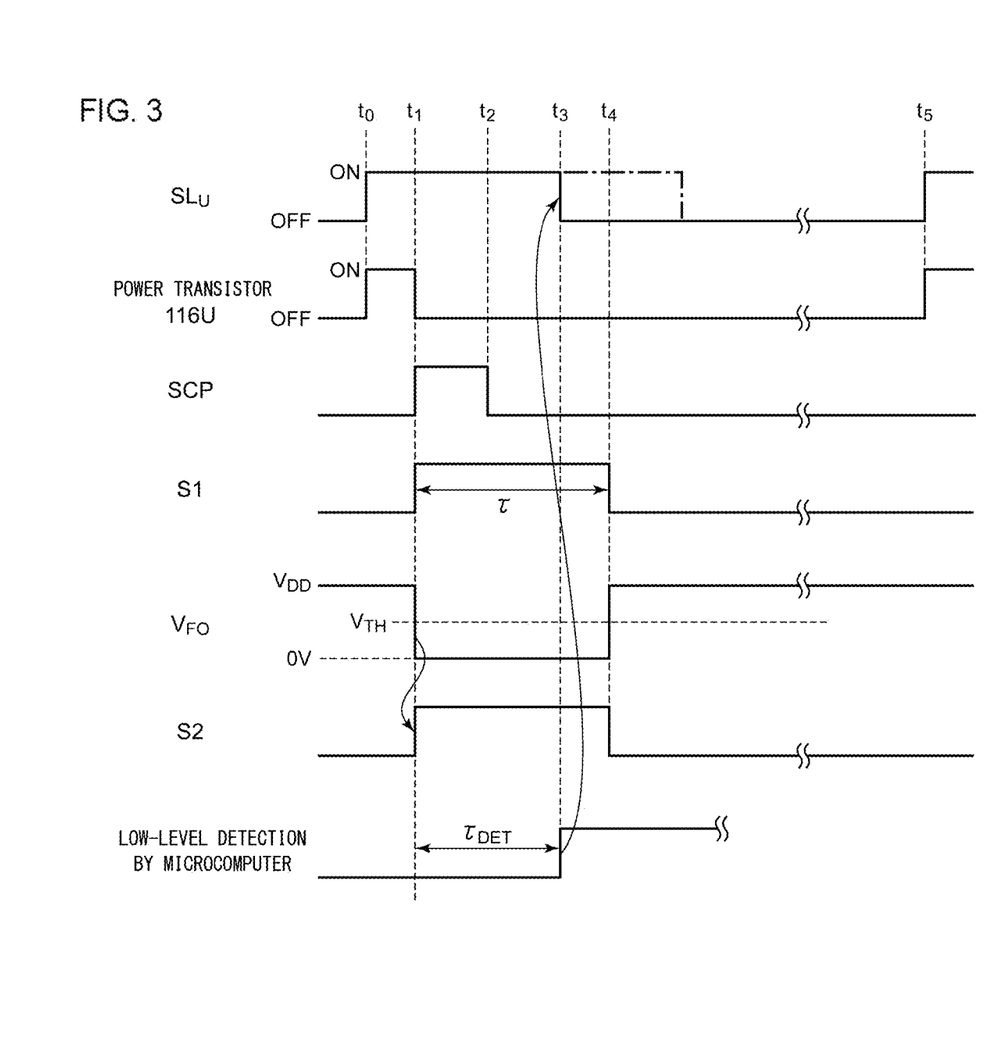
FIG. 3 is a diagram for explaining a first operation of the power module shown in FIG. 2.

FIG. 3 is a diagram for explaining a first operation of the power module 100 shown in FIG. 2. Description will be made directing attention to the U-phase. At the time point $t_0$, the control signal $SL_U$ received from the power module 10 is set to the high level, which instructs the lower arm 116U to turn on. In response to the instruction to turn on, the lower arm 116U is turned on.

At the time point $t_1$, an overcurrent state occurs, which asserts the SCP signal (set to the high level, for example). In response to the assertion of the SCP signal, the protection logic circuit 242 asserts (sets to the high level) the protection signal S1 during a predetermined period of time τ. That is to say, the protection signal S1 is configured as a pulse signal with the assertion of the SCP signal as a start point. The predetermined period of time τ may be set to on the order of several dozen to several hundred μs (e.g., 60 μs). The predetermined period of time τ may be changed for each kind of abnormal state. Also, the predetermined period of time τ may be set to 60 μs for the SCP signal, 120 μs for the UVLO signal, and 240 μs for the TSD signal.

The switching frequency of the inverter (PWM frequency) is designed to be on the order of 5 kHz to 20 kHz. For example, in a case in which the switching frequency of the inverter is set to 5 kHz, the period of the control signal SL (SH) for each phase is set to 200 s. It should be noted that the predetermined period of time τ is preferably designed to be longer than the response time of the microcontroller 310.

In another embodiment, the predetermined period of time τ may be designed to be on the order of several ms to several dozen ms. In this case, the predetermined period of time τ may be changed for each kind of abnormal state. For example, the predetermined period of time τ may be designed to be 2 ms for the SCP signal, 4 ms for the UVLO signal, and 8 ms for the TSD signal.

In response to the assertion (positive edge) of the protection signal S1, the control logic circuit 220 immediately turns off the lower arm 116U.

During a period in which the protection signal S1 is asserted, the alarm control circuit 250 turns on the output transistor 252. As a result, the voltage $V_{FO}$ at the FO pin is fixed to the low level (0 V). The judgment circuit 260 compares the voltage $V_{FO}$ at the FO pin with a threshold value so as to generate a judgment signal S2. In the example operation shown in FIG. 3, the assertion period of the judgment signal S2 substantially matches the assertion period of the protection signal S1.

At the time point $t_4$, the assertion of the protection signal S1 and the judgment signal S2 is released. However, the control logic circuit 220 maintains the off state (i.e., protection state) of the lower arm 116U. The off state (protection state) of the lower arm 116U is maintained until the time point t5 at which the control signal $SL_U$ received from the microcontroller 310 next transits to the high level.

It should be noted that the kind of the operation of the microcontroller 310 to be executed when the voltage $V_{FO}$ at the FO pin falls is not restricted in particular. Rather, the choice of such an operation is entrusted to the designer of the power conversion apparatus 300 as desired. For example, upon detecting the low level of the FO pin (FI pin), the microcontroller 310 may fix the control signals SL and SH to the low level so as to immediately and completely suspend the operation of the power conversion apparatus 300. In FIG. 3, the response time (detection time) required for the microcontroller 310 to detect the low level of the FI pin is represented by $\tau_{DET}$. Upon detecting the low level of the FI pin at the time point $t_3$, the microcontroller 310 switches the control signal $SL_U$ to the low level, which is to be maintained at the high level in a normal state as indicated by the line of alternately long and short dashes.

Upon detecting the low level of the FO pin (FI pin) at least once, the microcontroller 310 may completely suspend the operation of the power conversion apparatus 300. Alternatively, upon successively detecting the low level of the FO pin over multiple switching cycles, the microcontroller 310 may suspend the operation of the power conversion apparatus 300.

Figure 4:
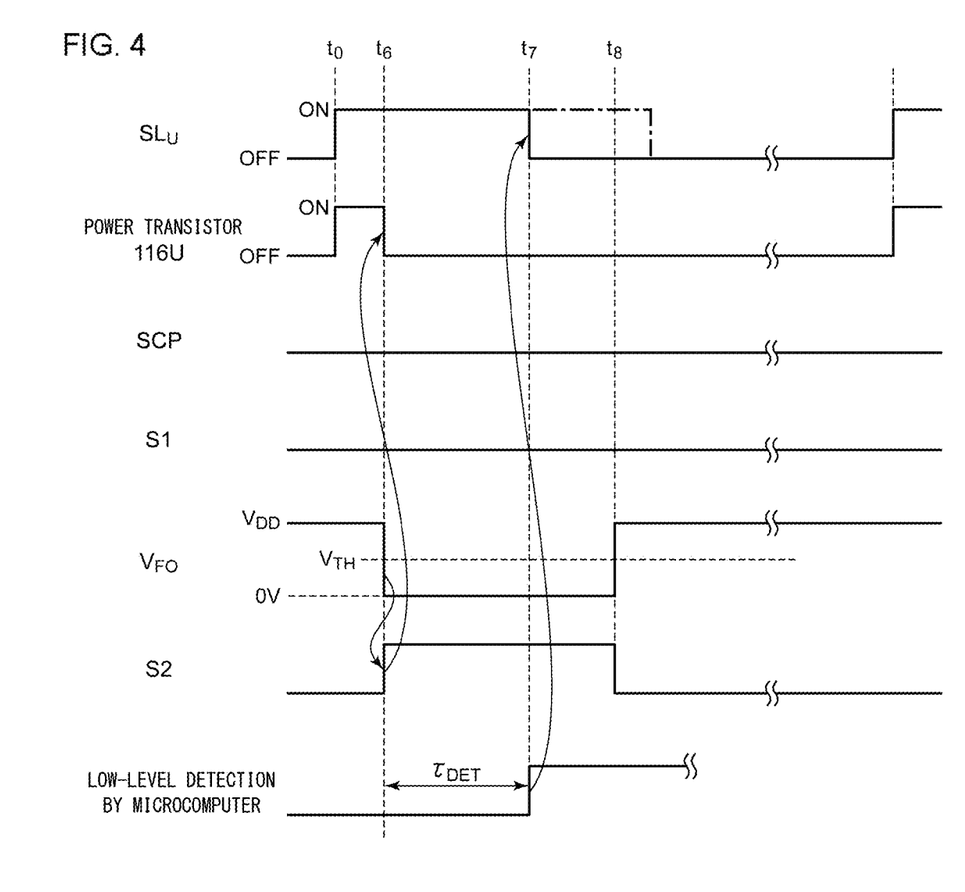
FIG. 4 is a diagram for explaining a second operation of the power module shown in FIG. 2.

FIG. 4 is a diagram for explaining a second operation of the power module 100 shown in FIG. 2. FIG. 4 shows a situation in which an abnormal state has not been detected in the internal components of the low-side driving circuit 200, but the FO pin is set to the low level at the time point $t_6$ due to a cause external to the low-side driving circuit 200. Examples of such an external cause include a short-circuit state such as short circuit to the ground, noise, etc. However, the external cause is not restricted to such examples. When the FO pin is set to the low level, the judgment signal S2 is asserted. In response to the assertion of the judgment signal S2, the control logic circuit 220 turns off the lower arm 116U. At the time point $t_7$ after the detection time $\tau_{DET}$ elapses after the FO pin is set to the low level, the microcontroller 310 detects the low level of the FI pin. In this state, the microcontroller 310 judges that an abnormal state has occurred in the power module 100, and sets the control signal $SL_U$ to the low level. When the external cause is removed at the time point $t_5$, the voltage $V_{FO}$ at the FO pin rises. When the voltage $V_{FO}$ exceeds the threshold value $V_{TH}$, the judgement signal S2 is negated.

The above is the operation of the power module 100. With the power module 100, both the internal state of the low-side driving circuit 200 indicated by the protection signal S1 and the state recognized by the microcontroller 310 indicated by the judgment signal S2 can be reflected in the control operation of the power transistors.

In particular, with the embodiment, when at least one from among the judgment signal S2 and the protection signal S1 indicates an abnormal state, the power transistors are forcibly turned off so as to suspend the driving operation. Even in a situation (i) in which an abnormal state has occurred in an internal component of the low-side driving circuit 200, but the microcontroller 310 has not recognized an abnormal state, this arrangement is capable of turning off the power transistors in a sure manner. Furthermore, (ii) when an abnormal state has not occurred in an internal component of the low-side driving circuit 200 (or otherwise an abnormal state has been removed after the occurrence of the abnormal state), but the microcontroller 310 judges that there is an abnormal state, this arrangement prioritizes the higher-level judgment by the microcontroller 310, thereby ensuring matching between the operation of the microcontroller 310 and the state of the low-side driving circuit 200.

Figure 5:
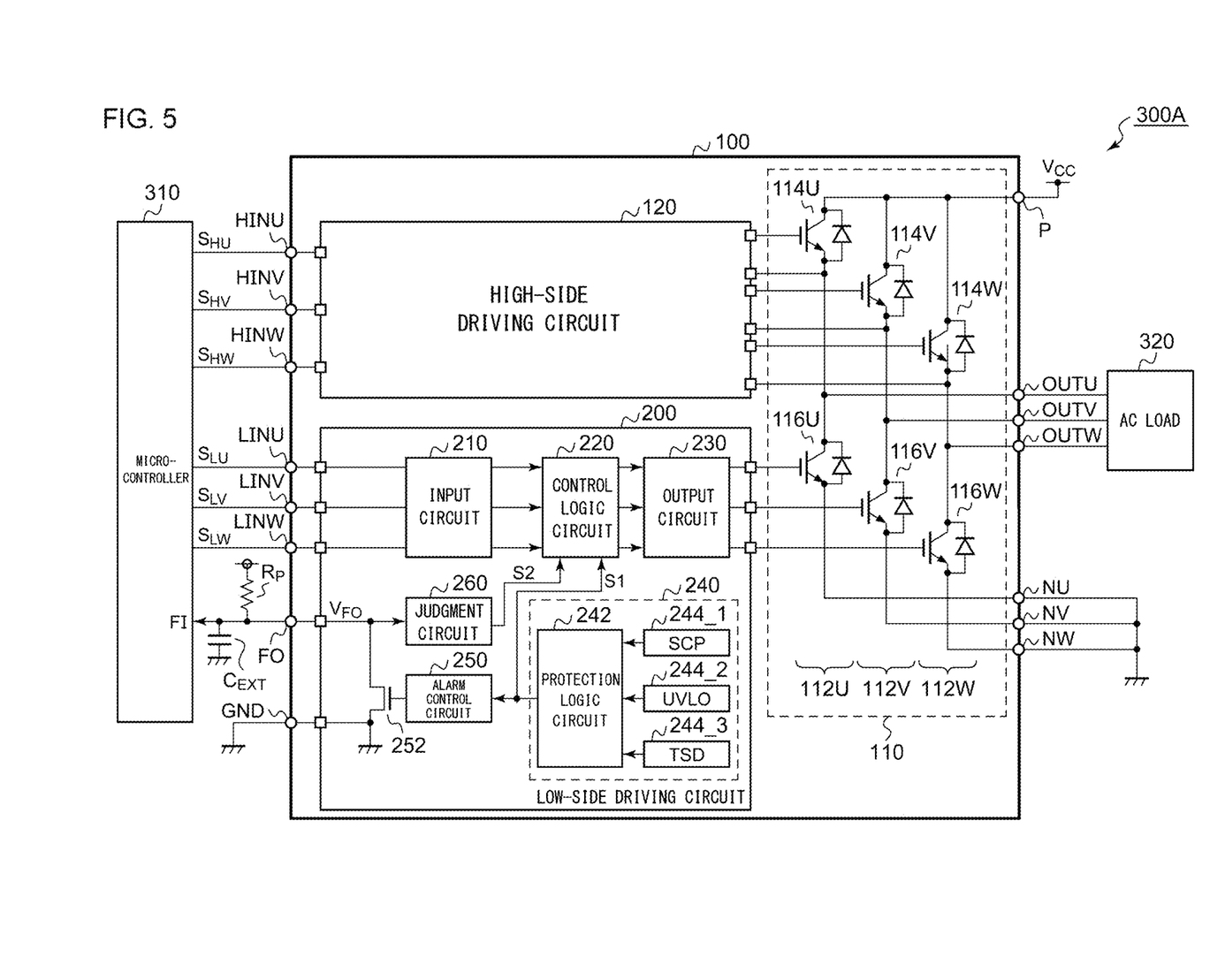
FIG. 5 is a block diagram showing a power conversion apparatus including a power module according to an embodiment.

FIG. 5 is a block diagram showing a power conversion apparatus 300A including the power module 100 according to the embodiment. In a case in which a low-speed microcontroller is employed in the application shown in FIG. 2, this arrangement involves a long detection period $\tau_{DET}$. On the other hand, the high-level period τ of the protection signal S1 is restricted by a timer circuit that can be built into the low-side driving circuit 200. When the relation $\tau_{DET} > \tau$ holds true, the microcontroller 310 is not able to detect an abnormal state. In order to solve this problem, in the power conversion apparatus 300A shown in FIG. 5, a capacitor $C_{EXT}$ is provided as an external component between the FO pin of the power module 100 and the ground. The other configuration of the power conversion apparatus 300A, including the configuration of the power module 100, is the same as that shown in FIG. 2.

By coupling the capacitor $C_{EXT}$ to the FO pin, this arrangement allows the low-level time of the FO pin to be extended longer than the predetermined period of time T. This allows the microcontroller 310 to be notified of an abnormal state.

Figure 6:
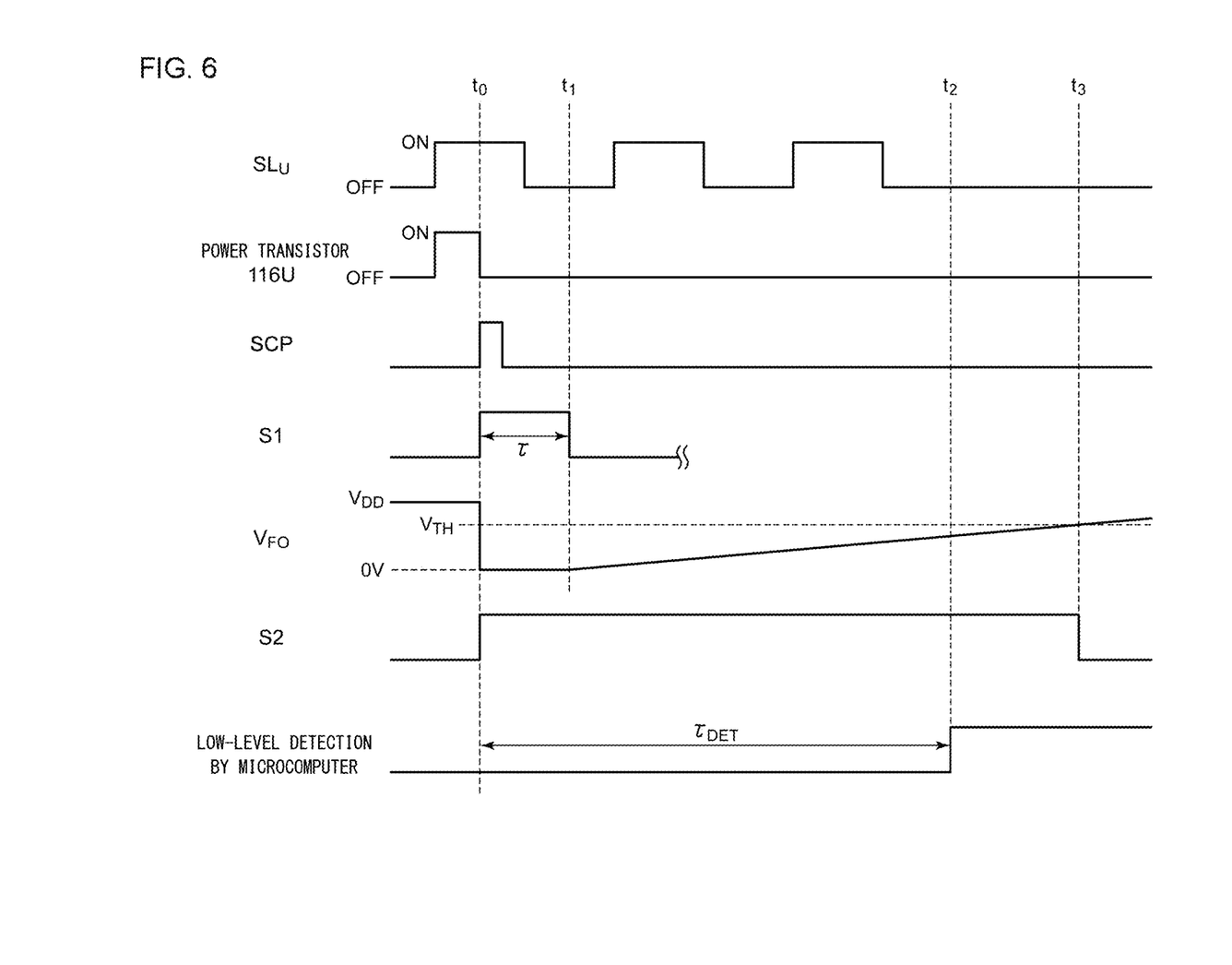
FIG. 6 is an operation waveform diagram showing the operation of the power conversion apparatus shown in FIG. 5.

Next, description will be made regarding the operation of the power conversion apparatus 300A shown in FIG. 5. FIG. 6 is an operation waveform diagram showing the operation of the power conversion apparatus 300A shown in FIG. 5. When the protection signal S1 is asserted at the time point to, the output transistor 252 is turned on, which sets the voltage $V_{FO}$ at the FO pin to the low level. When the protection signal S1 is negated at the time point $t_1$, the output transistor 252 is turned off. In this state, the voltage $V_{FO}$ at the FO pin rises based on the CR time constant defined by the pull-up resistor $R_P$ and the capacitor $C_{EXT}$. The time constant is designed to be longer than the detection time $\tau_{DET}$ of the microcontroller 310. When the microcontroller 310 has detected an abnormal state at the time point $t_2$ after the detection time $\tau_{DET}$ elapses, the control signal SL is fixedly set to the low level.

On the other hand, when the voltage $V_{FO}$ becomes the low level at the time point to, the judgment signal S2 is asserted. The assertion of the judgment signal S2 is maintained during a period until the time point $t_3$ at which the voltage $V_{FO}$ reaches the threshold value $V_{TH}$. During a period between the time points $t_0$ and $t_2$, the microcontroller 310 is not able to detect an abnormal state. Accordingly, the control signal $SL_U$ is switched to the high level for every period. However, the judgment signal S2 is asserted. This allows the control logic circuit 220 to maintain the lower-side arm 116U in the off state.

Figure 7:
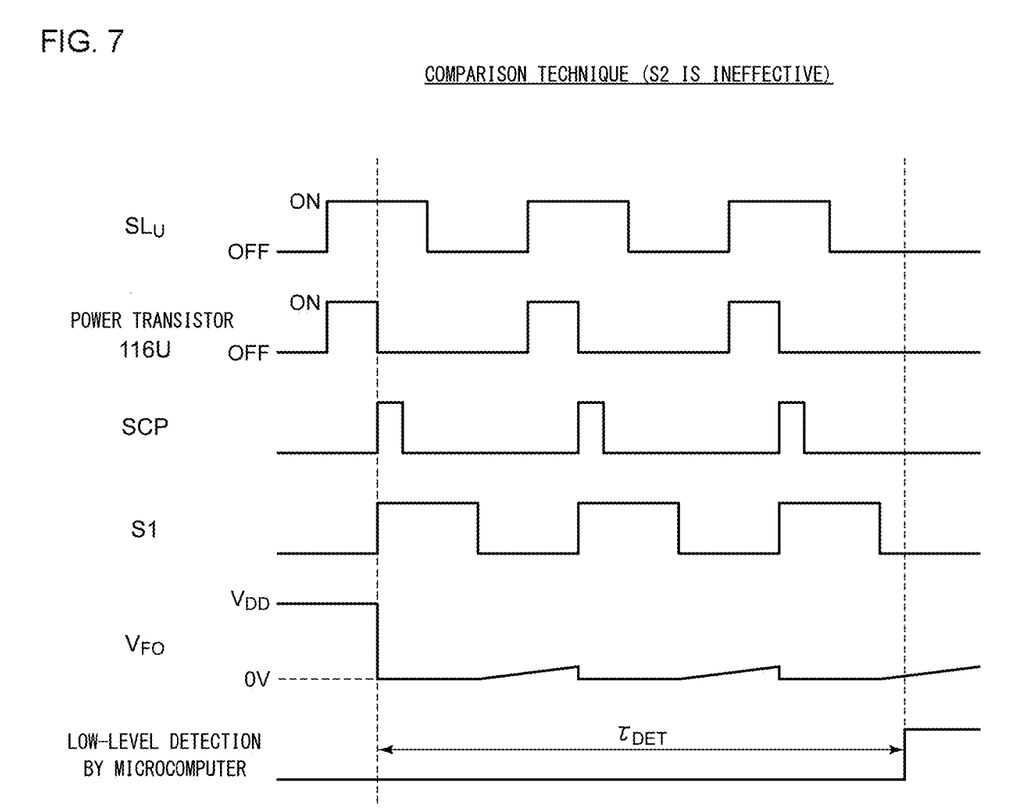
FIG. 7 is an operation waveform diagram showing an arrangement according to a comparison technique in a case in which a judgment signal is ineffective.

The advantage of the power conversion apparatus 300A shown in FIG. 5 can be clearly understood in comparison with the comparison technique. With such a comparison technique, the control logic circuit 220 is configured to turn off the power transistors in response to only the assertion of the protection signal S1 without referring to the judgment signal S2. FIG. 7 is an operation waveform diagram showing the operation supported by such a comparison technique, i.e., in a case in which the judgment signal S2 is ineffective. With such a comparison technique, if an abnormal state has occurred, a delay period is generated for the microcontroller 310 to detect the abnormal state. Accordingly, with this arrangement, the turning-on of the power transistor 116U occurs for every switching cycle during the delay period. This leads to unnecessary heat generation or the like, which is undesirable. In contrast, with the power conversion apparatus 300A shown in FIG. 5, the turning-on of the power transistor does not occur in the second and subsequent cycles, which has an advantage from the viewpoint of circuit protection.

Description has been made above regarding the present invention with reference to the embodiments. The above-described embodiments have been described for exemplary purposes only, and are by no means intended to be interpreted restrictively. Rather, it can be readily conceived by those skilled in this art that various modifications may be made by making various combinations of the aforementioned components or processes, which are also encompassed in the technical scope of the present invention. Description will be made below regarding such modifications.

First Modification

Figure 8A:
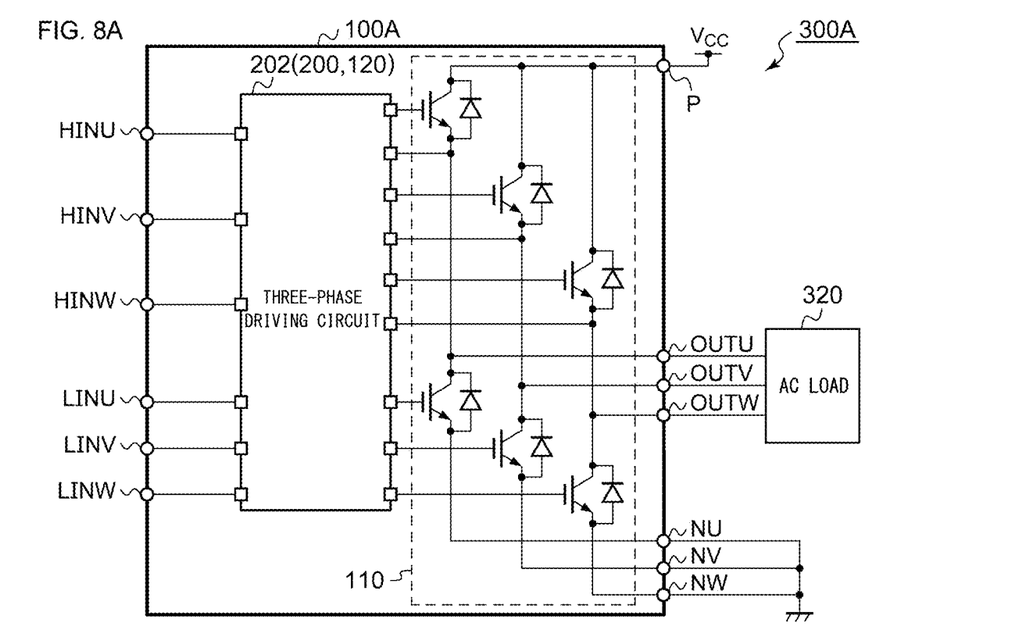
FIG. 8A and FIG. 8B are circuit diagrams showing power module circuits according to a first modification and a second modification, respectively.

FIG. 8A is a circuit diagram showing a power module 100A according to a first modification. A driving circuit 202 is an integrated circuit configured of the high-side driving circuit 120 and the low-side driving circuit 200 shown in FIG. 2 integrated on a single chip. The other configuration thereof is the same as that shown in FIG. 2.

Second Modification

Figure 8B:
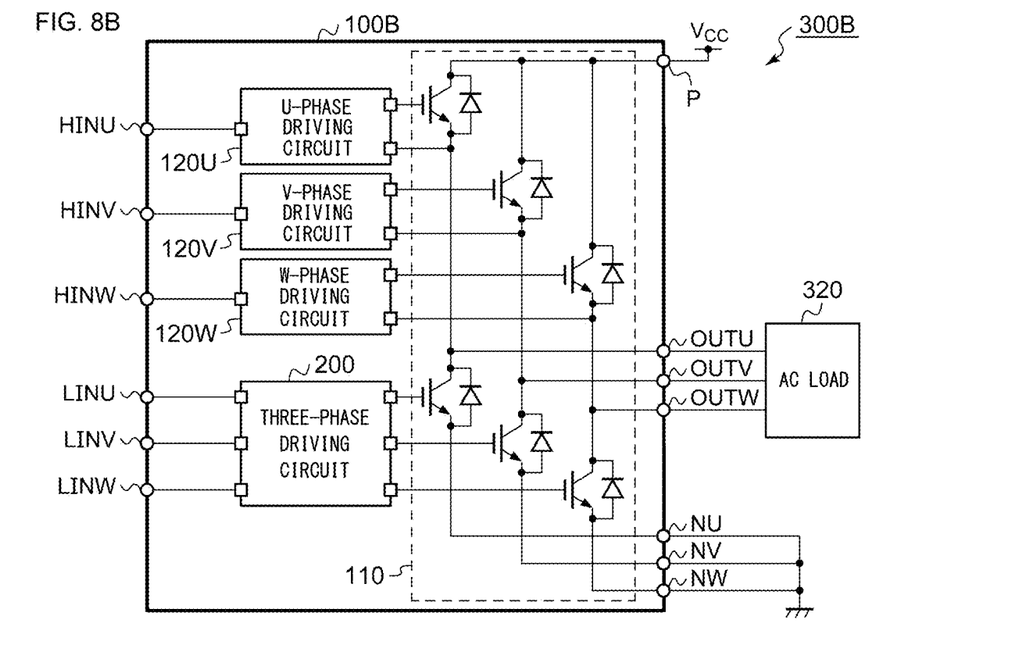

FIG. 8B is a circuit diagram showing a power module 100B according to a second modification. The power module 100B includes separate high-side driving circuits 120U through 120W configured independently for each phase, instead of the three-phase high-side driving circuit 120 shown in FIG. 2. The other configuration thereof is the same as that shown in FIG. 2.

Third Modification

Figure 9A:
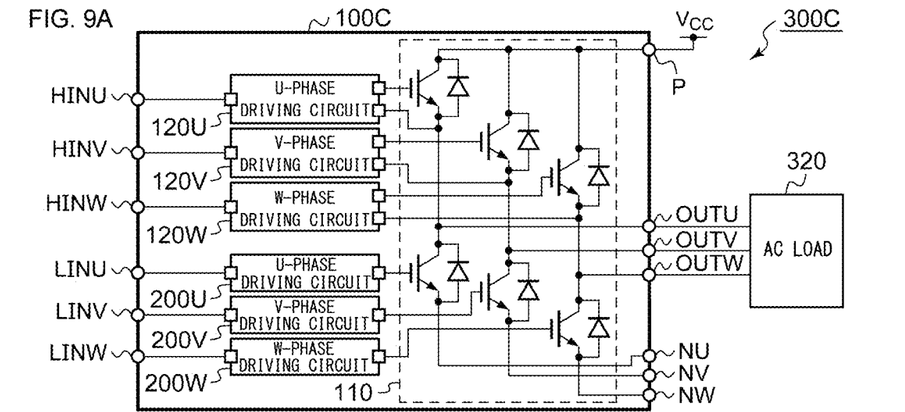
FIG. 9A through FIG. 9C are circuit diagrams showing power modules according to third through fifth modifications, respectively.

FIG. 9A is a circuit diagram showing a power module 100C according to a third modification. The power module 100C includes separate low-side driving circuits 200U through 200W configured independently for each phase, instead of the three-phase low-side driving circuit 200 shown in FIG. 8B. The other configuration thereof is the same as that shown in FIG. 8B.

Fourth Modification

Figure 9B:
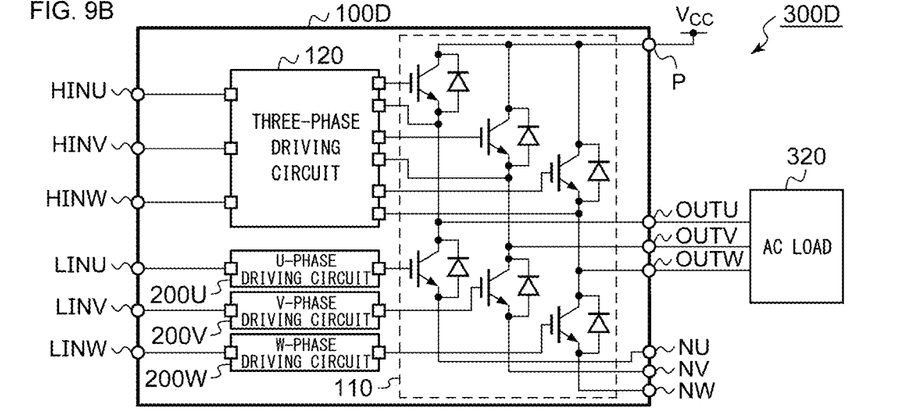

FIG. 9B is a circuit diagram showing a power module 100D according to a fourth modification. The power module 100D includes separate low-side driving circuits 200U through 200W configured independently for each phase, instead of the three-phase low-side driving circuit 200 shown in FIG. 2. The other configuration thereof is the same as that shown in FIG. 2.

Fifth Modification

Figure 9C:
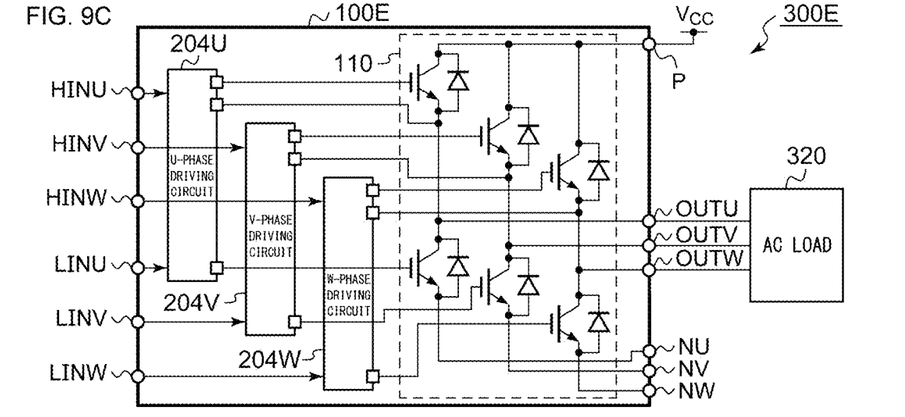

FIG. 9C is a circuit diagram showing a power module 100E according to a fifth modification. The power module 100E includes separate driving circuits 204U through 204W configured independently for each phase. Each driving circuit 204 # ("#" represents U, V, or W) is an integrated circuit configured of the driving circuit 120 # and 200 # shown in FIG. 9A integrated on a single chip.

Other Modifications

Description has been made in the embodiment regarding a three-phase inverter. Also, the present invention is applicable to a single-phase inverter and a H-bridge circuit configuration. Also, in addition to such inverters, the present invention is applicable to other kinds of power conversion apparatuses such as converters (AC/DC converters), bi-directional converters, etc.

Description has been made regarding the present invention with reference to the embodiments using specific terms. However, the above-described embodiments show only the mechanisms and applications of the present invention for exemplary purposes only, and are by no means intended to be interpreted restrictively. Rather, various modifications and various changes in the layout can be made without departing from the spirit and scope of the present invention defined in appended claims.

What is claimed is:

1. A driving circuit structured to drive a transistor to be driven, the driving circuit comprising:
    a protection circuit structured to generate a protection signal;
    a fail terminal;
    an alarm control circuit structured to change an electrical state of the fail terminal according to the protection signal;
    a judgment circuit structured to compare a voltage at the fail terminal with a predetermined threshold value, and to generate a judgment signal that indicates a comparison result; and
    a control logic circuit structured to control a state of the transistor based on the judgment signal and the protection signal.

2. The driving circuit according to claim 1, wherein, when at least one from among the judgment signal and the protection signal indicates an abnormal state, the control logic circuit suspends a driving operation of the transistor.

3. The driving circuit according to claim 1, wherein, in use, a capacitor is to be coupled to the fail terminal as an external component.

4. A power module comprising:
a power transistor; and
a driving circuit structured to drive the power transistor; and
a fail terminal,
wherein the driving circuit comprises:
- a protection circuit structured to generate a protection signal;
- an alarm control circuit structured to change an electrical state of the fail terminal according to the protection signal;
- a judgment circuit structured to compare a voltage at the fail terminal with a predetermined threshold value, and to generate a judgment signal that indicates a comparison result; and
- a control logic circuit structured to control a state of the power transistor based on the protection signal and the judgment signal.

5. The power module according to claim 4, wherein, when at least one from among the judgment signal and the protection signal indicates an abnormal state, the control logic circuit suspends a driving operation of the power transistor.

6. The power module according to claim 4, wherein, in an operation thereof, a capacitor is provided as an external component to the fail terminal.

7. The power module according to claim 4, further comprising a capacitor coupled to the fail terminal.

* * * * *